US012636219B2

(12) United States Patent
Aukes et al.

(10) Patent No.: US 12,636,219 B2
(45) Date of Patent: May 26, 2026

(54) SYSTEMS AND METHODS FOR ORIGAMI-INSPIRED WEARABLE ROBOTS FOR TRUNK SUPPORT

(71) Applicants: Daniel Aukes, Gilbert, AZ (US); Dongting Li, Gilbert, AZ (US)

(72) Inventors: Daniel Aukes, Gilbert, AZ (US); Dongting Li, Gilbert, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 504 days.

(21) Appl. No.: 18/206,496

(22) Filed: Jun. 6, 2023

(65) Prior Publication Data

US 2024/0091092 A1 Mar. 21, 2024

Related U.S. Application Data

(60) Provisional application No. 63/349,440, filed on Jun. 6, 2022.

(51) Int. Cl.
*A61H 3/00* (2006.01)

(52) U.S. Cl.
CPC ....... *A61H 3/008* (2013.01); *A61H 2003/007* (2013.01); *A61H 2201/5058* (2013.01)

(58) Field of Classification Search
CPC . B25J 9/10; B25J 9/0006; B25J 9/142; A61H 1/00; A61H 1/02; A61H 3/00; A61H 3/008; A61H 2003/007; A61H 2201/5058; A61H 2201/16; A61H 2201/1623; A61H 2201/165; A61H 2205/081; A61H 2205/10; A61H 1/0237; A61H 1/024; A61H 1/0244; A61H 1/0255; A61H 1/0259; A61H 1/0262; A61H 1/0266; A61H 1/0274; A61H 1/0277; A61H 1/0281; A61H 1/0285; A61H 1/0288; A61H 1/0292; A61H 1/0296;
(Continued)

(56) References Cited

U.S. PATENT DOCUMENTS

| | | | | |
|---|---|---|---|---|
| 4,939,982 A * | 7/1990 | Immega | F15B 15/103 92/92 |
| 5,178,137 A * | 1/1993 | Goor | A61F 5/0111 601/40 |

(Continued)

FOREIGN PATENT DOCUMENTS

| | | | |
|---|---|---|---|
| CN | 114770478 A * | 7/2022 | B25J 9/08 |

OTHER PUBLICATIONS

Machine translation of written description and claims of CN114770478A via google patents (Year: 2022).*

(Continued)

*Primary Examiner* — Bradley H Philips
*Assistant Examiner* — Tyler A Raubenstraw
(74) *Attorney, Agent, or Firm* — Polsinelli PC

(57) ABSTRACT

Systems and methods for a wearable "exo-shell" to improve the gait of elderly people during obstacle avoidance tasks are disclosed. With payload and energy expenditure as a main focus of this design, the present system leverages switchable, passive systems, in combination with lightweight materials that minimize additional metabolic costs, while remaining as "transparent" to the user as possible when inactive.

20 Claims, 13 Drawing Sheets
(13 of 13 Drawing Sheet(s) Filed in Color)

(58) Field of Classification Search
CPC .... A61H 2001/0248; A61H 2001/0251; A61H 2001/027
See application file for complete search history.

(56) References Cited

U.S. PATENT DOCUMENTS

| | | | | |
|---|---|---|---|---|
| 5,727,391 | A * | 3/1998 | Hayward | F03G 7/0635 60/528 |
| 5,845,540 | A * | 12/1998 | Rosheim | B25J 3/04 414/4 |
| 7,617,762 | B1 * | 11/2009 | Ragner | F16J 3/06 92/37 |
| 10,080,701 | B1 * | 9/2018 | Bagheri | A61H 3/008 |
| 11,684,752 | B2 * | 6/2023 | Nakata | A61M 25/0155 600/152 |
| 2010/0222711 | A1 * | 9/2010 | Lajeunesse | A61B 5/1124 600/595 |
| 2010/0298102 | A1 * | 11/2010 | Bosecker | A61H 1/0237 482/54 |
| 2013/0131560 | A1 * | 5/2013 | Ferguson | A61F 5/026 601/33 |
| 2014/0100493 | A1 * | 4/2014 | Craig | B25J 9/0006 601/35 |
| 2017/0340468 | A1 * | 11/2017 | Akiyama | B25J 9/0006 |
| 2017/0354525 | A1 * | 12/2017 | Rybchinskya | A63B 21/00181 |
| 2018/0338883 | A1 * | 11/2018 | Chavarria | A61H 3/00 |
| 2019/0070058 | A1 * | 3/2019 | Kurzweg | A61F 5/03 |
| 2019/0307182 | A1 * | 10/2019 | Wiley | A61N 2/008 |
| 2019/0344456 | A1 * | 11/2019 | Baptista | B25J 9/0006 |
| 2021/0030613 | A1 * | 2/2021 | Kodama | G06F 3/011 |
| 2021/0045954 | A1 * | 2/2021 | Jang | B25J 9/1075 |
| 2022/0080247 | A1 * | 3/2022 | Carreras | A63B 21/4043 |
| 2023/0339096 | A1 * | 10/2023 | Alam | H02S 99/00 |

OTHER PUBLICATIONS

Aktas et al., A modeling framework for jamming structures, Advanced Functional Materials, vol. 31, No. 16, p. 2007554, 2021.
Aktas et al., Flexure mechanisms with variable stiffness and damping using layer jamming, IEEE IROS, 2019.
Aukes et al., An analytic framework for developing inherently-manufacturable pop-up laminate devices, vol. 23, No. 9, p. 094013, Aug. 2014.
Aukes et al., Design and testing of a selectively compliant underactuated hand, The International Journal of Robotics Research, vol. 33, No. 5, pp. 721-735, 2014.
Aukes et al., PopupCAD: a tool for automated design, fabrication, and analysis of laminate devices, in Micro- and Nanotechnology Sensors, Systems, and Applications VII. SPIE, 2015.
Awad et al., A soft robotic exosuit improves walking in patients after stroke, Science Translational Medicine, vol. 9, No. 400, p. eaai9084, Jul. 2017.
Banerjee et al., Origami-layer-jamming deployable surgical retractor with variable stiffness and tactile sensing, ASME JMR, 2020.
Belke et al., Mori: A modular origami robot, IEEE-ASME Transactions on Mechatronics, vol. 22, No. 5, pp. 2153-2164, Oct. 2017.
Chu et al., On the biomimetic design of the Berkeley lower extremity exoskeleton (BLEEX), 2005.
Collo et al., A quasi-passive lower limb exoskeleton for partial body weight support, 2016 6th IEEE BioRob, 2016.
Deshpande et al., Origami-inspired bidirectional soft pneumatic actuator with integrated variable stiffness mechanism, 2017 IEEE (ICAR), 2017.
Felton et al., A method for building self-folding machines, Science, 2014.
Filipov et al., Origami tubes assembled into stiff, yet reconfigurable structures and metamaterials, PNAS, 2015.
Firouzeh et al., An under-actuated origami gripper with adjustable stiffness joints for multiple grasp modes, vol. 26, No. 5, p. 055035, Apr. 2017.
Firouzeh et al., Robogami: A fully integrated low-profile robotic origami, ASME JMR, 2015.
Hanna et al., Waterbomb base: a symmetric single-vertex bistable origami mechanism, Smart Materials and Structures, 2014.
Hawkes et al., Programmable matter by folding, PNAS, 2010.
Hyun et al., Biomechanical design of an agile, electricity-powered lower-limb exoskeleton for weight-bearing assistance, Robotics and Autonomous Systems, vol. 95, pp. 181-195, Sep. 2017.
Jiang et al., Chain-like granular jamming: A novel stiffness-programmable mechanism for soft robotics, Soft Robotics, vol. 6, No. 1, pp. 118-132, Feb. 2019.
Kazerooni et al., On the control of the Berkeley lower extremity exoskeleton (BLEEX), in IEEE ICRA, Apr. 2005, pp. 4353-4360.
Kazerooni et al., The Berkeley lower extremity exoskeleton, Journal of Dynamic Systems, Measurement, and Control, vol. 128, No. 1, pp. 14-25, Sep. 2005.
Kazerooni, The human power amplifier technology at the University of California Berkeley, Robotics and Autonomous Systems, 1996.
Kermavnar et al., Discomfort/Pain and Tissue Oxygenation at the Lower Limb During Circumferential Compression: Application to Soft Exoskeleton Design, Hum Factors, vol. 62, No. 3, pp. 475-488, May 2020.
Kim et al., A Novel Layer Jamming Mechanism With Tunable Stiffness Capability for Minimally Invasive Surgery, IEEE Transactions on Robotics, vol. 29, No. 4, Aug. 2013.
Lee et al., Autonomous multi-joint soft exosuit with augmentation-power-based control parameter tuning reduces energy cost of loaded walking, Journal of NeuroEngineering and Rehabilitation, vol. 15, No. 1, p. 66, Dec. 2018.
Li et al., Compliant fins for locomotion in granular media, IEEE RA-L, 2021.
Lin et al., Controllable stiffness origami "skeletons" for lightweight and multifunctional artificial muscles, Advanced Functional Materials, 2020.
Liu et al., Invariant and smooth limit of discrete geometry folded from bistable origami leading to multistable metasurfaces, Nature Communications, 2019.
Loschak et al., A robotic system for actively stiffening flexible manipulators, IEEE IROS, vol. 2015, pp. 216-221, 2015.
Menguc et al., Wearable soft sensing suit for human gait measurement, International Journal of Advanced Robotic Systems, vol. 33, No. 14, pp. 1748-1764, Dec. 2014.
Mete et al., Closed-loop position control of a self-sensing 3-DoF origami module with pneumatic actuators, IEEE RA-L, vol. 6, No. 4, pp. 8213-8220, Oct. 2021.
Mintchev et al., Bioinspired dual-stiffness origami. Science Robotics, 2018.
Narang et al., Mechanically versatile soft machines through laminar jamming, Advanced Functional Materials, 2018.
Narang et al., Transforming the dynamic response of robotic structures and systems through laminar jamming, IEEE RA-L, 2018.
Nevisipour et al., Trunk control in young healthy adults requires large adaptations during and after obstacle avoidance with a cognitive task, in The 45th Annual Meeting of the American Society of Biomechanics, Aug. 2021, p. 420.
Perez Vidal et al., Soft Exoskeletons: Development, Requirements, and Challenges of the Last Decade, Actuators, vol. 10, No. 7, p. 166, Jul. 2021.
Perry et al., Upper-limb powered exoskeleton design, IEEE/SAME Transactions on Mechatronics, vol. 12, No. 4, pp. 408-417, Aug. 2007.
Phoenix | suitx. [Online]. Available: https://www.suitx.com/.
Pratt et al., The roboKnee: an exoskeleton for enhancing strength and endurance during walking, in IEEE ICRA, vol. 3, Apr. 2004, pp. 2430-2435 vol. 3.
Quinlivan et al., Assistance magnitude versus metabolic cost reductions for a tethered multiarticular soft exosuit, Science Robotics, Jan. 2017.
Rupal et al., Lower-limb exoskeletons: Research trends and regulatory guidelines in medical and non-medical applications, International Journal of Advanced Robotic Systems, vol. 14, No. 6, p. 172988141774355, Nov. 2017.

(56) References Cited

OTHER PUBLICATIONS

Salmoiraghi et al., Review of Wearable Robotic Assistive Devices for Integration with Pressure Suit Arms, in 42nd International Conference on Environmental Systems. San Diego, California: American Institute of Aeronautics and Astronautics, Jul. 2012.

Santiago et al., Soft robots and kangaroo tails: Modulating compliance in continuum structures through mechanical layer jamming, Soft robotics, 2016.

Sargent et al., An origami-based medical support system to mitigate flexible shaft buckling, ASME JMR, 2020.

Shah et al., Jamming skins that control system rigidity from the surface, Advanced Functional Materials, 2020.

Sharifzadeh et al., Draft: An integrated design and simulation environment for rapid prototyping of laminate robotic mechanisms, in IDETC-2018.

Sharifzadeh et al., Reconfigurable curved beams for selectable swimming gaits in an underwater robot, IEEE RA-L, vol. 6, No. 2, pp. 3437-3444, 2021.

Tolley et al., Self-folding origami: shape memory composites activated by uniform heating, Smart Materials and Structures, vol. 23, No. 9, p. 094006, Sep. 2014.

Van Herpen et al., Case Report: Description of two fractures during the use of a powered exoskeleton, Spinal Cord Ser Cases, vol. 5, No. 1, p. 99, Dec. 2019.

Walsh et al, A quasi-passive leg exoskeleton for load-carrying augmentation, International Journal of Humanoid Robotics, 2007.

Wehner et al., A lightweight soft exosuit for gait assistance, in 2013 IEEE ICRA, May 2013.

Zhai et al., Origami-inspired, on-demand deployable and collapsible mechanical metamaterials with tunable stiffness, PNAS, 2018.

Zoss et al., Biomechanical design of the Berkeley lower extremity exoskeleton (BLEEX), IEEE/ASME Transactions on Mechatronics, vol. 11, No. 2, pp. 128-138, Apr. 2006.

* cited by examiner

100

Rotate
Ground

Rotate
Translate
Ground

Top Contact

Half Width
Full Width
Belt

Bottom view
Align
Unfold

Layers
1 Rigid
2 Adhesive
3 Flexible
4 Sensor
5 Adhesive
6 Rigid
Fold
Laminate

Conductor
Fold

Sensor
Hinge
Flip
Bottom Contact
Magnet

100

End-effector
End-effector
triangle
Tip
: joint
: pulley
: ground

100

SYSTEMS AND METHODS FOR ORIGAMI-INSPIRED WEARABLE ROBOTS FOR TRUNK SUPPORT

CROSS REFERENCE TO RELATED APPLICATIONS

This is a non-provisional application that claims benefit to U.S. Provisional Application Ser. No. 63/349,440, filed on Jun. 6, 2022, which is herein incorporated by reference in its entirety.

FIELD

The present disclosure generally relates to an exo-shell device for improving the gait of a person during obstacle avoidance tasks, and in particular to an origami-inspired wearable robots for trunk support of a person.

BACKGROUND

A variety of rigid exoskeletons have been developed for improving mobility over the decades. High forces and torques provided by those rigid exoskeletons assist the ankle, hip and/or knee, facilitating activities such as walking or lifting heavy objects. However, due to the complexity of the human musculoskeletal system, adjusting and aligning human and robot joints has proven difficult, increasing the metabolic cost of the wearer and the external energy expenditure of the attached system. Heavy, high-torque, and often non-backdriveable systems can also be a safety risk for the wearer when the control system fails or misalignments occur.

More recent innovations in soft robotic techniques have resulted in an "exo-suit"-style technology in which tendons routed through Bowden cables provide pulling forces across joints. While this has addressed many of the issues stemming from traditional exoskeleton designs, it has also resulted in increased forces across human joints, which can lead, over time, to damaging the user's joints through increased wear. Furthermore, wearable robotic orthoses often fail to break even on metabolic cost, although there have been some notable recent exceptions. One common nuance of a number of exo-skeleton/suit is that they are often designed and tuned for one purpose, such as lifting, walking, running, or carrying loads. Fewer wearable devices provide the versatility required to be worn as a multipurpose device throughout the day, again with notable exceptions.

Many of the above wearable robotic systems employ active sensing and feedback control techniques to quickly respond to the wearer's motion and provide powered assistance both to assist the user as well as to offset the extra weight of the system itself. In many cases, however, the small control delays imposed by digital control techniques also add small but perceptible loads to the wearer that can over time lead to accelerated fatigue and reduced efficacy.

Thus, a middle ground is still desired, in which wearable systems provide alternate loading pathways across joints, where a variety of capabilities can be enabled or disabled on-demand based on the user's activity, and in which the trade-off between wearability and utility is made not through the use of active, timed, energy addition via powered joints, but by minimizing the weight of rigid systems, and by powering the system to change its state.

It is with these observations in mind, among others, that various aspects of the present disclosure were conceived and developed.

SUMMARY

Aspects of the present disclosure can take the form of a system, device, and/or methods thereof related to a wearable "exo-shell" device inspired by the human spine for improving the gait of elderly people during obstacle avoidance tasks. This device features a serial chain of lockable joints that can be stiffened using a braking system inspired by laminar jamming concepts. This is an affordable wearable system that can be quickly fabricated and whose design can be adjusted to fit the individual wearer. With payload and energy expenditure as a main focus of this design, the design leverages switchable, passive systems, in combination with lightweight materials that minimize additional metabolic costs, while remaining as "transparent" to the user as possible when inactive. The system features integrated, affordable sensors distributed at each joint that will be used in conjunction with predictive biomechanics—types of machine-learning algorithms—to lock on demand in response to an anticipated state change.

The locking design (brake system) permits the device to be worn relatively "transparently" when unlocked so as to not impede the wearer's normal movement. When activated, it can stiffen so as to nudge/guide the user to adopt a different gait.

In some examples, the present disclosure can take the form of a device including a body comprising a base and a plurality of segments (e.g., triangle) formed via laminate fabrication and serially connected over the base, a sensor assembly including one or more sensors that that measure joint angles associated with the plurality of triangle segments, and a brake system configured to stiffen joints lockable joints of the plurality of triangle segments, including a belt engaged to each of the plurality of triangle segments, and a motorized clamp that applies forces to the belt. The device can further include a microcontroller positioned along the base of the body that engages the motorized clamp in response to an anticipated state change computed from the joint angles to stiffen the lockable joints of the plurality of triangle segments and provide support to the user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

Figures 1A, 1B, 1C, 1D:
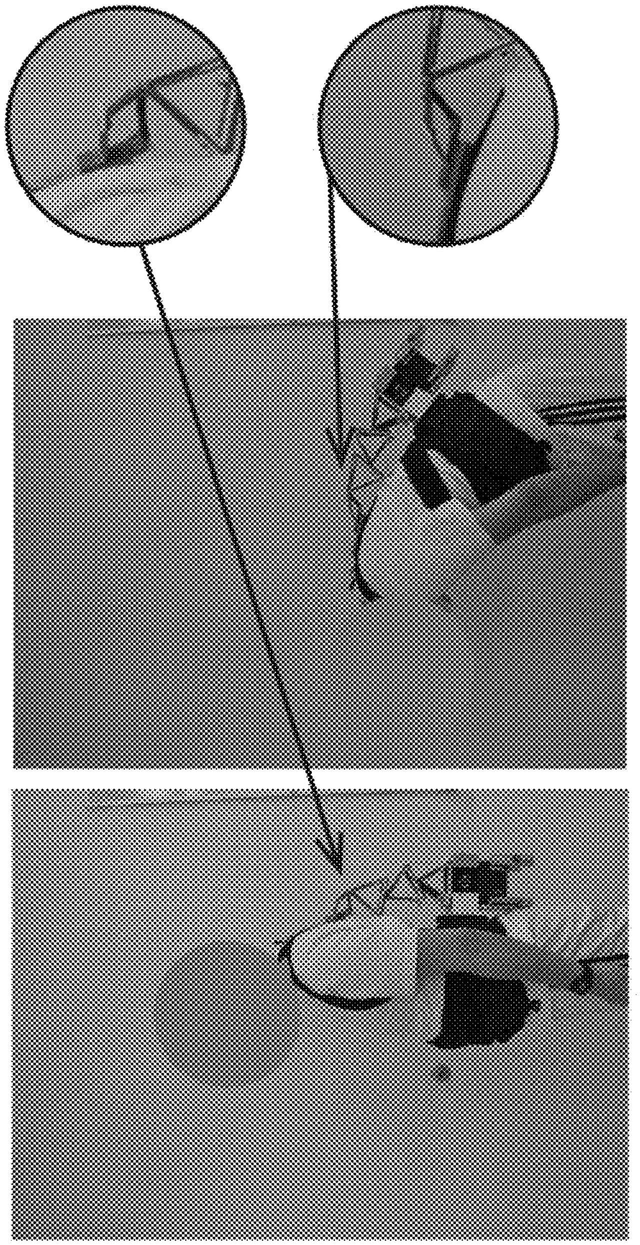
FIGS. 1A-1D are images illustrating the configuration change as a function of posture.

The present disclosure includes systems and examples of origami-inspired, laminate fabrication techniques as the fundamental technology for creating light-weight, high-stiffness, and rapidly-manufacturable wearable mechanisms. Origami robots are capable of providing high structural stiffness. Furthermore, the incorporation of sensors into origami structures has proven itself to be a promising method for sensorizing modular origami segments.

A variety of methods may be used to stiffen or lock origami mechanisms, including shape memory polymers (SMP), bistable patterns, electrostatic jamming, and laminar jamming. In particular, layer jamming has proven itself compact and lightweight while providing high locking forces. This technique typically employs a negative pressure gradient over soft membranes, either within a bag or distributed across a planar surface, to bring layered sliding materials into close contact. As the pressure grows, the friction between layers increases to slow and stop relative motion between layers. Pneumatic-based jamming, however, necessitates high-pressure negative differential pressures, which must be supplied by a vacuum pump. This is less ideal for compact, portable designs that must be worn, because the size and weight of these pumps can be exceedingly large to achieve the required pressures through narrow tubing in a short amount of time. Mechanical clamping can address some of those issues, permitting small, non-back-driveable motors to generate high normal forces. Accordingly, examples of an origami-inspired (wearable) robotic system described herein include a serial chain of lockable joints that can be mechanically stiffened using a braking system inspired by laminar jamming concepts.

Materials and Methods

Design rationale: Based on preliminary human motion data, it was determined that interventions along the sagittal plane at the wearer's trunk (waist) pose the best opportunity for reducing reaction torques in elderly users. For the purposes of the inventive design herein, examples of a device 100 are configured to be attached around the waist and just below the shoulder blades (as seen in FIGS. 1A-1D) and stiffen on demand along the sagittal plane. In particular, FIGS. 1A-1D illustrate configuration change as a function of posture: (a) a person standing straight, with the system in a nominal configuration; (b) as the person bends over, the distal segment, a four-bar parallel mechanism, lengthens to accommodate the user; (c) and (d) highlight the translation of the four-bar mechanism.

Origami-Inspired Element

When an exo-shell device (100) is mounted along the back, with the lower end fixed to the waist and the distal end mounted between the shoulders, relative motion from the wearer bending forward dictates both rotation between serial links as well as lengthening in the attached exo-shell device to remain securely attached to the desired locations. Thus, both rotational and translational degrees of freedom (DOF) are required to fully adapt to the wearer's motion. Two basic elements are proposed as the building blocks for the present device.

In general, the device 100 includes a body 102 configured for mounting along a back of a user as described herein. The body 102 includes a base 104, and a plurality of rotational elements/segments, such as triangle segments 106 formed via laminate fabrication (as described herein) and serially connected over the base 104. The device 100 further includes an integrated sensor assembly including one or more sensors 108 positioned along the body that measure joint angles associated with the plurality of triangle segments 106. The device 100 further includes a brake system 110 configured to stiffen joints lockable joints of the plurality of triangle segments, including at least one of a belt 112 engaged to each of the plurality of triangle segments 106, at least one motorized clamp 114 that applies forces to the belt, and a tension mechanism 116 including at least one spring-loaded pulley 117 described herein. In addition, the device 100 includes a microcontroller 118 positioned along the base 104 of the body 102 that engages the motorized clamp 114 in response to an anticipated state change computed from the joint angles to stiffen the lockable joints of the plurality of triangle segments 106 and provide support to the user.

In some examples, the base 104 defines a housing 120 at least partially enclosing a motor 122 (e.g., step motor) that operates the brake clamp 114 upon activation by the microcontroller 118, and the housing 120 can also optionally store the microcontroller 118. In addition, the device 100 can include an end effector 124 as described herein. The microcontroller 118 can also be configured to perform operations described herein, such as computing an anticipated state change from joint angles measured by the sensors 108. In some examples, the microcontroller 118 is in operable communication with a memory storing instructions to perform such operations; i.e., the microcontroller 118 can execute instructions stored in a memory including any form of machine-readable medium. The instructions may be implemented as code and/or machine-executable instructions executable by the microcontroller 118 that may represent one or more of a procedure, a function, a subprogram, a program, a routine, a subroutine, a module, an object, a software package, a class, or any combination of instructions, data structures, or program statements, and the like. In other words, one or more of the features for operating the brake system 110 and other functions described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium, and the microcontroller 118 performs the tasks defined by the code. In some embodiments, the microcontroller 118 is a processing element of a cloud such that the instructions may be implemented via a cloud-based web application.

Figure 1E:
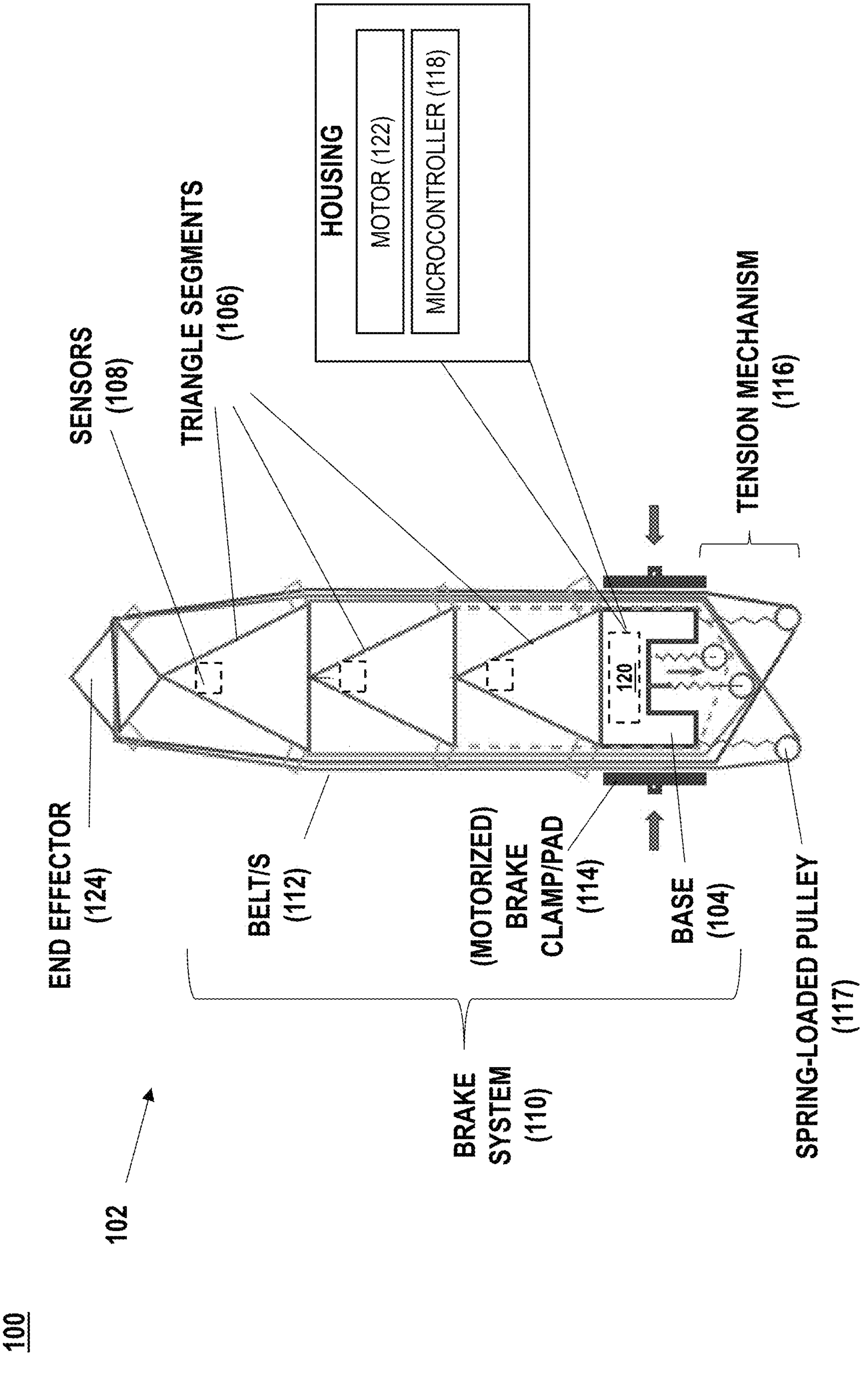
FIG. 1E is a simplified illustration of the device described herein demonstrating example features.

A simple illustration of aforementioned components is illustrated in FIG. 1E. FIG. 1E is not intended to show an exhaustive list of elements of the inventive concept nor is it intended to be limiting with respect to position and orientation of the same; but is merely included to illustrate general features of the inventive concepts described herein.

Figures 2A, 2B, 2C, 2D, 2E, 2F, 2G, 2H, 2I:
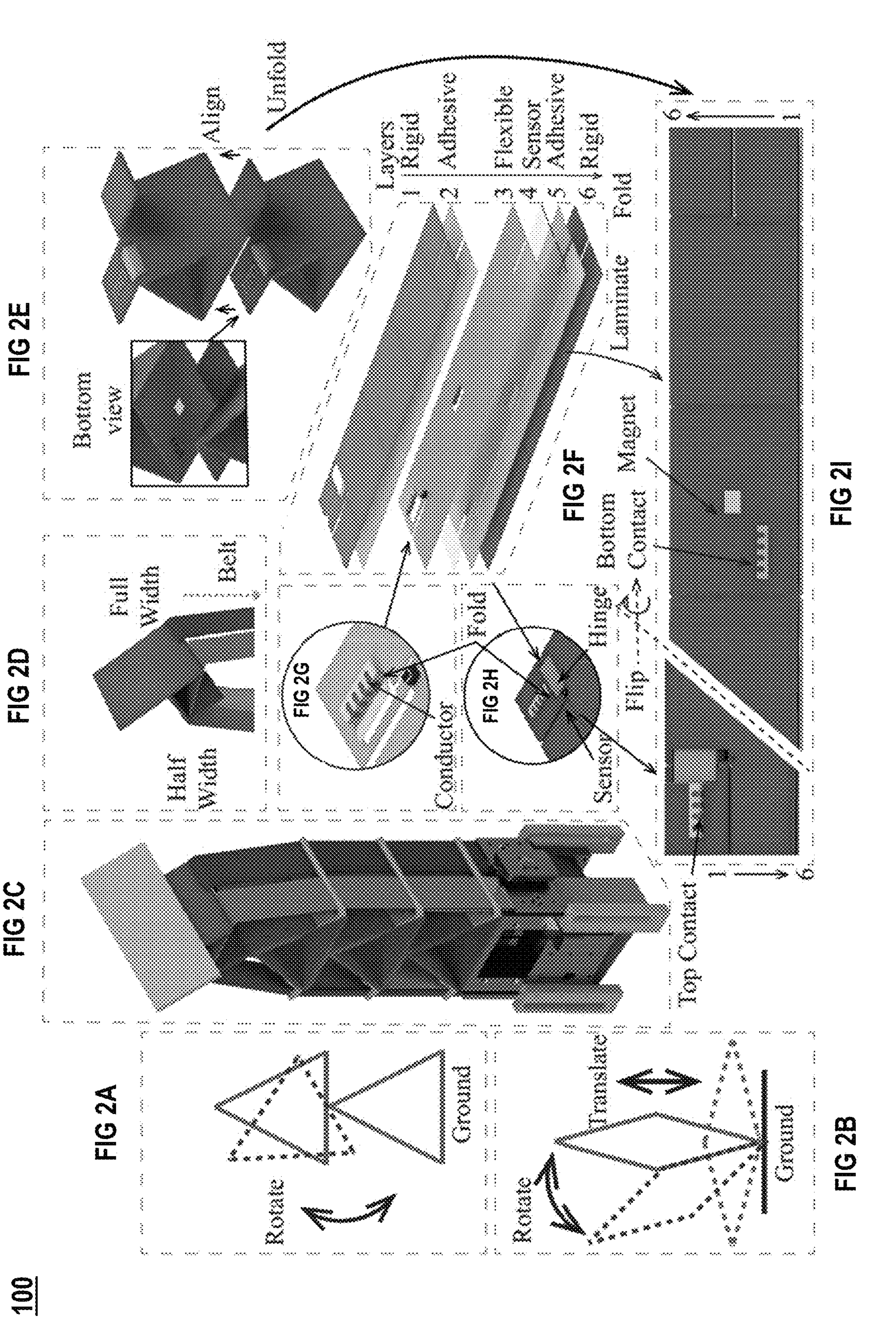
FIGS. 2A-2I are illustrations showing the manufacturing process of the origami-inspired system.

In some examples, triangles are implemented as a fundamental shape for the one-DOF rotational elements because, as fundamental elements of trusses, they form stiff, lightweight structures, and are compatible with the subject planned laminate fabrication technique. For example, successive triangles can be connected as shown in FIGS. 2A and 2E; the proximal joint of each link is located at a point along the triangle's base. The distal joint of each link is located at the top vertex of the triangle; the next most distal triangle's origin (also located along its base) is thus connected to this point. In this design, the outer faces of the triangle segments 106 serve as simple joint limits to restrict motion to a specific range; this range can be adjusted by modifying the triangle's dimensions and base connection point. This adjustability is a useful way to fit to individual users while achieving high stiffness in a thin material. Because of the location of the envisioned wearable device 100, it is expected that the device will need to both rotate and translate to accommodate its wearer. In one example, a four-bar origami mechanism was selected for the final segment; it is capable of both rotation and translation, as shown in FIGS. 2B and 2D.

Manufacturing

FIGS. 2A-2F illustrate example manufacturing of the origami-inspired system: (a) a triangle element with one rotational DOF above it (two configurations shown); (b) the four-bar diamond segment exhibits both transnational and rotational DOFs, as seen in the three displayed configurations (c); assembled device; (d) the four-bar "diamond" segment; (e) aligned triangle segment with contact pads aligned to the previous segment; (f) different material layers are stacked and aligned prior to lamination—the layer number and name can be seen on the rigid side; (g) and (h) show a closer view of the conductors and sensors, showing how the contact pad is folded twice to expose the copper side to the next segment; and (i) top and bottom views of the laminated triangle segment, divided by the dashed line and flipped to see the bottom.

More specifically, following a laminate fabrication approach, the mechanism is designed using 3D computer-aided design (CAD) software. Each layer of the laminate is generated and then exported to a file for laser cutting using a custom Python script1. The layers of the element are illustrated in FIG. 2F. They consist of a sandwich of two thick rigid layers of material on the outer layers, followed by layers of adhesive, a middle flexible layer to form a living hinge, and a flexible circuit layer for mounting and connecting the embedded sensors to power and communication. The rigid, adhesive, and hinge layers are cut with an Epilog Fusion M2 75 W CO2 laser cutter; the flex-circuit layer is manufactured using a masking and chemical etching process. Four copper traces on the flex circuit layer permit communication using the I2C protocol to each sensor. All the layers are then aligned using locating pins and bonded using a heat press. After the circuit layer is laminated to the other layers, the full laminate is then cut away from remaining scrap with a final release cut.

After the segments are folded into their final configuration they are serially connected to the next element, as shown in FIG. 2E. Once the positions of the circuit layer components are confirmed, the I2C bus can then be connected. The conductors from a proximal segment are aligned and connected to the next distal segment so that sensors integrated directly onto the flex circuit can communicate back to the micro-controller located in the base.

Integrated Sensor Layer and Sensor

To measure joint angles, hall effect sensors are soldered directly on the flex circuit layer and connected to the $I^2C$ bus. In each individual module, the hall effect sensor is mounted as close as possible along the axis of the segment's distal hinge to maintain the sensor's linearity in rotation; a disk magnet is then positioned near the same axis on the next distal segment. With sensor and magnet precisely mounted into the segments, the sensor's signal thus changes as the distal link rotates. The location of the sensor and magnet can be seen in FIGS. 2E and 2G. The calculation of the joint angle using these values is discussed further below.

Brake Design

Figures 3A, 3B, 3C:
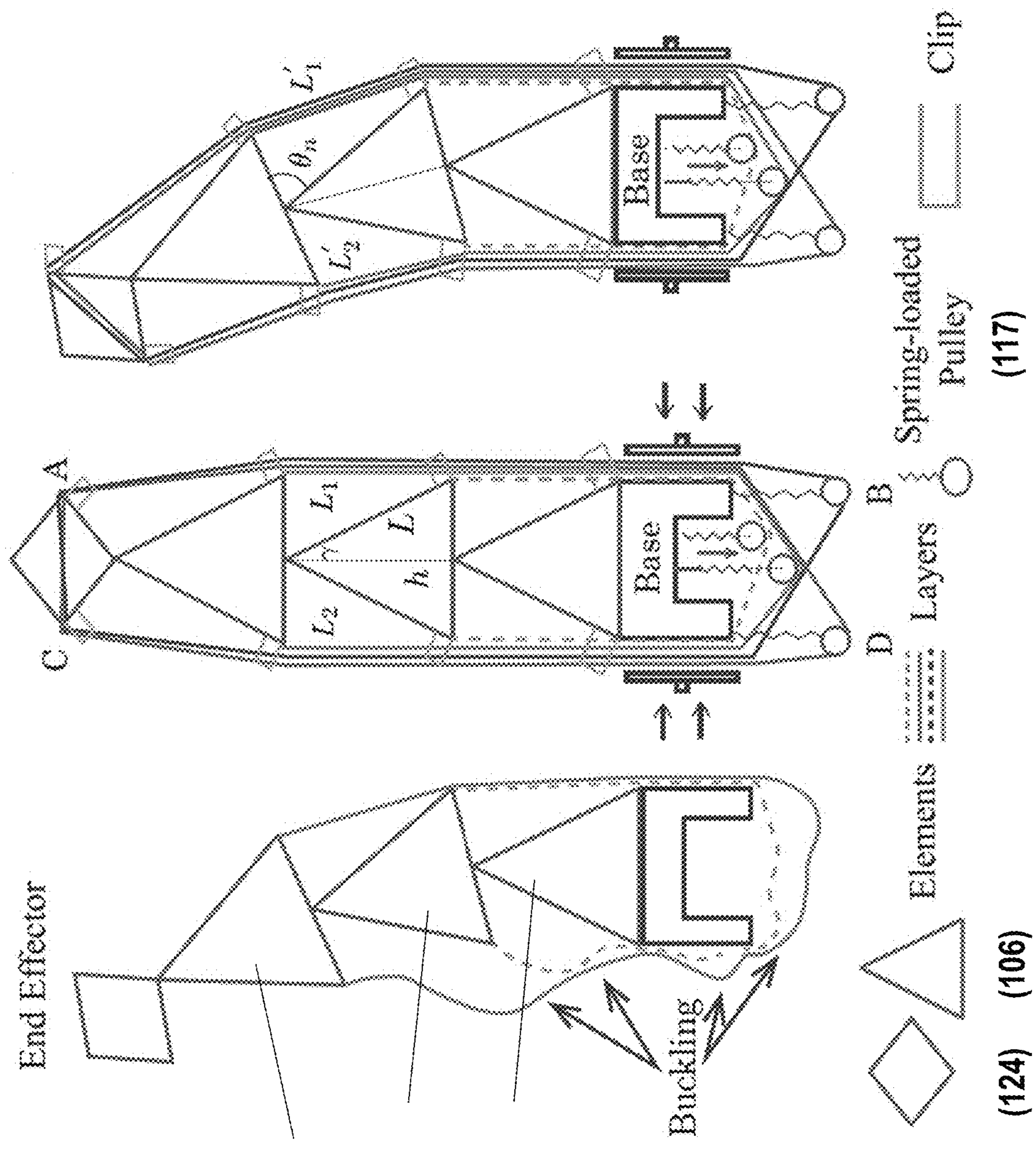
FIGS. 3A-3C are illustrations showing the design and integration of the brake.

The mechanical design of the brake consists of three main parts: (1) flexible, sliding sheet-based belts attached to each moving segment of the wearable system, (2) a motorized clamp for applying normal forces to the belts, and (3) a tension mechanism that maintains tension in each belt to minimize backlash, as seen in FIG. 3B. FIG. 3A illustrates how buckling might happen, and FIG. 3B shows a sketch of the sine where the tension mechanism 116 and clips are integrated to the base station to prevent buckling. The different components are labeled with various color and line types. In FIG. 3C, one possible required length for the layers changes is shown as a function of the configuration.

In the triangular segments, one belt is attached to each side of the two lower vertices of the triangular segment, as shown in FIG. 3B. The lower portion of these belts is clamped to the base of the device via two motorized, self-aligning brake pads in the base station. These clamps are actuated via lead screws to stepper motors, which are controlled by an Arduino UNO using a TB6600 stepper motor driver. When activated, the motors drive the lead screws to clamp the belts on each side of the base station, locking all the degrees of freedom together.

The length of the belt traveling around the base station and attaching to each segment is not constant, and is a function of the system configuration, as seen in FIG. 3C. For example, the total length of the layers on the side, $L_1+L_2$, varies as: $\sqrt{W^2/4+L^2-WL\cos(\theta_n)}+\sqrt{W^2/4+L^2-WL\cos(\pi-\gamma-\theta_n)}$ with a decrease of about 3.39% in length at its limit compared to $\theta_n=0°$. Excess slack in those configurations causes backlash in the system, which can lead to unintended shocks, misalignments and unintended stresses in the belt, and can ultimately lead to premature damage of the system, as shown in FIG. 3A. To prevent buckling and keep the layers flat within the clamping area, the present system adds (1) a tension mechanism that utilizes a spring-loaded pulley to maintain tension at the bottom of the belt and (2) 3D-printed clips with clearance to allow layers to slide while maintaining a position constraint at each segment's vertices, as shown in FIG. 3B.

Figures 4A, 4B, 4C:
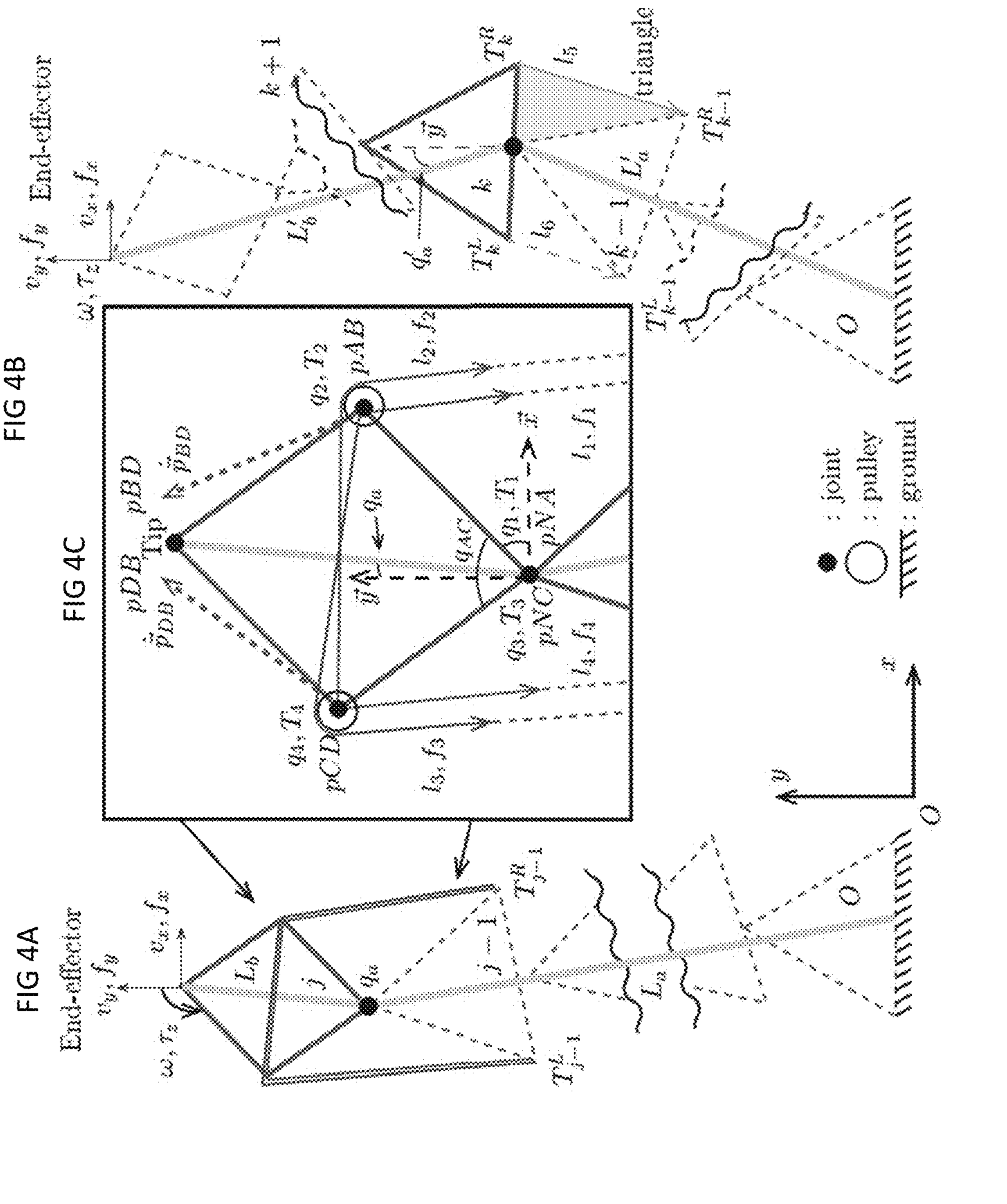
FIGS. 4A-4C are illustrations of a simplified kinematic model of the j-th four-bar element mounted on j−1-th triangle illustrating how the belts are routed on the four-bar element and kinematics constraints.

Two belts are attached in a similar way to the two-DOF four-bar segment at each end to fully lock the segment when needed. FIG. 4C highlights the internal routing within the segment, while FIGS. 3A-3C show the external routing. The red belt attached to point A passes down to the base along each triangular segment, around a spring-loaded pulley/tensioner, back up the other side, around a pulley on point C, and attaches back to point A. The green belt is routed in a similar fashion, but is attached to point C. The kinematics of this routing are detailed herein.

According to previous literature, an empirical law for calculating resistive force, $F_B$, for one jamming layer that slides between the brake pads can be calculated as follows:

$$F_B=\mu SNP \tag{1}$$

where μ is the friction coefficient between layers, S is the area of jamming, N stands for the total jammed layer number and P represents the negative pressure on the jammed materials.

System Kinematics

Two parametric models have been developed for understanding the kinematics of our locking serial mechanism. These two models represent the two basic segments of our system, as introduced in FIGS. 2A-2I: triangular, single DOF segments, and a four-bar parallel mechanism that can both translate and rotate, located at the most distal segment. Together, these two models can help to understand how belts, routed through the system, can be expected to perform when constrained by the locking mechanism located in the base. This can be used for number of purposes, including verifying the performance of our current system and estimating the kinds of performance-focused redesigns required to ensure that locking forces on all joints can support similar loading conditions by the wearer. FIGS. 4A-4C highlight the details of our belt routing and system kinematic variables and our process for solving for the belt forces can be summarized as follows.

The system configuration is first aligned, which defines the joint orientations and thus the end-effector location. The dimensions of each link and the belt routing path geometry determines the direction of all belt force vectors, which can then be determined. Because the belts span across joints the way they do, it is readily apparent that the effective moment arm of the belts about each joint is dependent on this state. A set of forces is then assigned at the end effector. These can be supplied either as a set of numerical or symbolic values.

The present system proceeds to analyze one link at a time, assuming that the selected segment is slipping, while all other joints remain fixed. This permits the system to analyze the brake slip limits at each joint independently. Based on the direction of forces supplied at the end effector, only one of the two belts routed to each triangular segment will be in tension. The present system solves for the tensile force in each one degree-of-freedom joint required to maintain static equilibrium against the external end-effector force by formulating the problem as a constrained minimization problem, where the combination of forces must be minimized while keeping belt tensions positive.

For the final four-bar linkage, there are a total of four links and four belts, but only two total degrees of freedom, with only two belts ever in tension at a time. Based on the fact that the four-bar linkage is a parallel mechanism, the present system can solve for the independent motion variables first, to generate the Jacobians mapping internal and external forces to each other, and then use those Jacobians to solve for the two out of four belt tensions that are holding the system in static equilibrium in that specific state. The present system again uses a constrained minimization formulation to solve for belt tensions.

Given all the belt tensions solved for in the serial link kinematics, the present system then evaluates which of those tensions is the highest, and what the required braking force (normal to the belts) will be, using an experimentally-determined coefficient of friction. To symbolically solve the belt forces and the kinematics of each segments as well as the full-body kinematics, the present models the structure in Pynamics, a custom Python library using Kane's method to derive symbolic equations of motion. A master Python script reads the system's configuration and generates the state variables for each segment. The required locking force is solved for each triangle after calculating the four-bar locking forces using two sub-scripts respectively. The corresponding scripts can be found in the repository.

To understand the required forces for the segments, the present system first calculates the force required to lock the most distal segment under external loading, as a case study of understanding the full-body static force balances. This four-bar linkage, consists of a set of independent joints ($q_i=[q_1, q_3]$) and dependent joints ($q_d=[q_2, q_4]$) as shown in FIGS. 4A and 4C, such that:

$$q=\begin{bmatrix} q_i \\ q_d \end{bmatrix}=[q_1\ q_3\,|\,q_2\ q_4]^T. \tag{2}$$

The planar four-bar linkage can be thought of as two serial RR chains connected at their respective ends via a pin joint. The motion of $\vec{p}_{BD}$ and $\vec{p}_{DB}$, or the position of the two distal points on each serial chain are thus constrained together with the equation $\vec{z}=\vec{p}_{BD}-\vec{p}_{DB}=\vec{0}$. The time derivative of this vector equation with respect to the Newtonian reference frame permits us to linearize this equation with respect to the system's velocity variables $\dot{q}_i$ and $\dot{q}_d$, respectively.

$$\dot{\vec{z}}=\dot{\vec{p}}_{BD}-\dot{\vec{p}}_{DB}=\vec{0} \tag{3}$$

$$\dot{z}=\dot{\vec{z}}\cdot[\hat{x}\hat{y}]^T. \tag{4}$$

Using the relation:

$$A=\left[\frac{\partial \dot{z}}{\partial \dot{q}_i}\right], B=\left[\frac{\partial \dot{z}}{\partial \dot{q}_d}\right] \tag{5}$$

The present system can then split z into independent and dependent parts $\dot{z}=A\dot{q}_i+B\dot{q}_d=0$ and solve for $\dot{q}_d$ $$\dot{q}_d=\underbrace{\left[-B^{-1}\ A\right]}_{C}\dot{q}_i \tag{6}$$

The Cartesian velocity of the end-effector can be expressed by the well-known equation $\dot{x}=J\dot{q}_i$, where $$\dot{x}=\left[\dot{\vec{p}}_{BD}\cdot\hat{x}\dot{\vec{p}}_{BD}\cdot\hat{y}\omega\right]^T\cdot J$$

is derived by expressing:

$$\dot{x}=J_i\dot{q}_i+J_d\dot{q}_d. \tag{7}$$

Where $$J_i=\left[\frac{\partial \dot{x}}{\partial \dot{q}_i}\right] \text{ and } J_d=\left[\frac{\partial \dot{x}}{\partial \dot{q}_d}\right].$$

By substituting in (6) and collecting terms, $$\dot{x}=(J_i\dot{q}_i+J_dC\dot{q}_i)=\underbrace{(J_i+J_dC)}_{J}\dot{q}_i \tag{8}$$

The flat belts used for locking the four-bar segment are routed as illustrated in FIG. 4C, where belt $l_1$ is connected to point pAB and then routed along the proximal triangle elements through point $$T_{j-1}^R,$$

continuing to the base where it is connected to belt $l_3$. Belt $l_2$ is attached at point pCD and routed around a virtual pulley co-located at pAB and finally routed down along right side of each triangle down to the base, connecting at the bottom to belt $l_4$. On the left side, $l_3$ and $l_4$ are routed along the left side of the system in the same way, connecting to $l_1$ and $l_2$, respectively. When clamped, however, the two sides of each belt must be considered independent, and their forces analyzed separately. The velocity $\dot{l}$ of these four belts can be expressed as:

$$\dot{l}=\left[\dot{l}_1\ \dot{l}_2\ \dot{l}_3\ \dot{l}_4\right]^T=J_t\dot{q}_i \tag{9}$$

where:

$$J_t=\left[\frac{\partial \dot{l}}{\partial \dot{q}_i}\right]. \tag{10}$$

The present system can thus equate the torques on the independent degrees of freedom $q_i$ from the belts to the equal and opposite torque from the end-effector to the same joints. The required end-effector force $f=[f_x f_y\ \tau_z]^T$ can be then calculated according to the tension in the belts $f_t=[f_1\ f_2\ f_3\ f_4]^T$ using the principle of virtual work to obtain:

$$\tau_{ind}=J^Tf=J_t^Tf_t \tag{11}$$

$$J^Tf-J_t^Tf_t=0$$

Since the $J_t$ is a 4×2 matrix, it is clear that the four forces from the brakes act redundantly on the present system. Because, however, they can only act in tension, a valid solution for obtaining static equilibrium must ignore cases when tension in the belts is negative. To solve this problem, the present system formulates it as a constrained minimization problem, minimizing the sum of the square of the belt tensions at a given external tip force, while in a specific configuration as:

$$\min - f_{t(i)}^Tf_{t(i)} \tag{12}$$

subject to $$g(f_t):\ J^Tf-J_tf_t=0 \tag{13}$$

$$h(f_t);\ f_t\geq 0 \tag{14}$$

The present system calculates the $f_{min}(q)$ at different configurations of the four-bar as a function of q. The resulting minimum force solution can be then used to determine the locking force requirements for the four bars on the top.

The present system also models the force interactions of the i-th triangle segment at an arbitrary location as shown in FIG. 4B. The distal hinge of this triangle is connected to the base of the distal four-bar "diamond" segment. The belts on the triangle are connected to the corresponding vertices of the successive triangle and shown in FIG. 4B as $l_5$, $l_6$. As the triangles are connected to the successive element on its top vertices and the motion of four-bar element will not affect the triangles, we simplify the kinematics to serial linkages.

For example, while solving the k-th triangle, we create a virtual link, $L_a$ connected to the bottom of this triangle tilted around the origin. The remainder of this system can be then simplified to a virtual link, $L_b$ rotated along the first link. These length and angular velocities ($L_a$, $L_b$, $q_a$) of the system can be calculated according to the current configurations of the device.

The Cartesian velocity of the end-effector $$\left(\dot{x}=\dot{\vec{p}}_{BD}\cdot[\hat{x}\hat{y}]^T\right)$$

can be expressed as $$\dot{x} = J\dot{q}_i \tag{15}$$

where $$J = \left[\frac{\partial x}{\partial \dot{q}_i}\right].$$

The velocities $\dot{l}_t$ of the layers mounted on the triangles can be expressed as $$\dot{l}_t = [\dot{l}_5, \dot{l}_6]^T = J_i q_i \tag{16}$$

$$J_t = \left[\frac{\partial \dot{l}_t}{\partial \dot{q}_i}\right] \tag{17}$$

The triangle belt velocities can be then related to the independent end-effector velocities. The minimal layer forces, $f_t=[f_5, f_6]^T$ under external load, f can be calculated using a similar approach described in Eq. (11) to (14) and formulated as $$\min - (f_5^2 + f_6^2) \tag{18}$$

subject to $$g(f_t)\colon J^T f - J_t f_t = 0 \tag{19}$$

$$h(f_t);\ f_t \geq 0 \tag{20}$$

The present system then obtains the minimal layer force for the triangles. By modifying the orientation of the triangle and the corresponding belts, the present system is then able to solve each of the triangles at an arbitrary location.

Results and Analysis

Brake Performance

Figure 5:
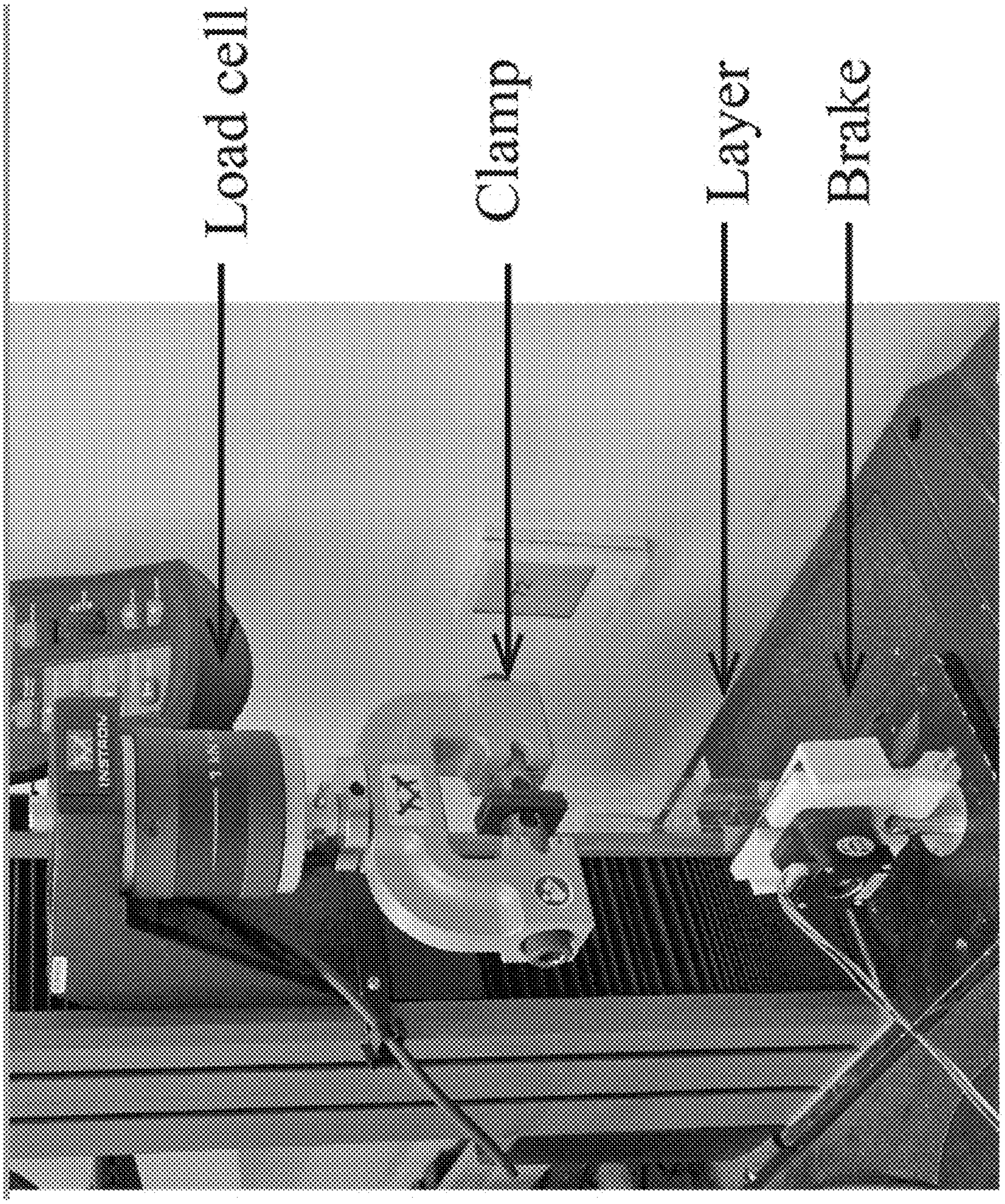
FIG. 5 is an image of an Instron instrument measuring tensile forces.

To measure the force generated by the brake, we use an Instron 5944 machine with 1 kN load cell at 1 kHz sampling rate as shown in FIG. 5. The machine's fixture is clamped to the end of the layer. To facilitate the test, a one-sided clamping mechanism was fabricated with an end cap that can be easily attached to the Instron machine by plugging a metal locating pin. All other design parameters, dimensions, and materials remain consistent with the belts integrated into the base station. Once attached to the Instron, the brake's stepper motor activates, clamping the belts against the housing and the Instron subsequently begins a measurement cycle. The friction coefficient between the brake pad and belt was measured in this way to be 0.017 N/m.

Angle Sensing Using Embedded Sensors

Figure 6A:
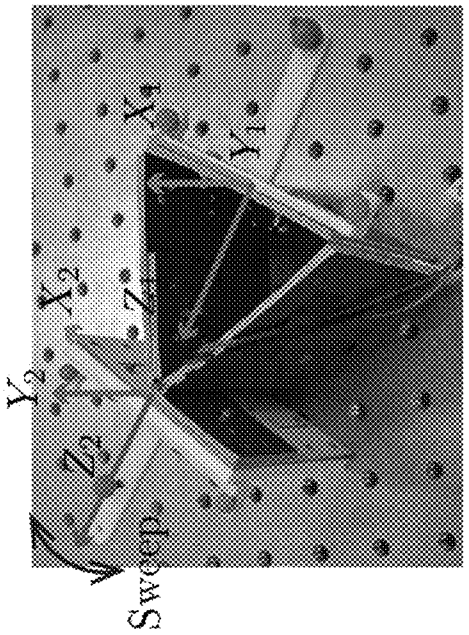
FIG. 6A is an image showing tracking markers permit the relative rotation between two rigid bodies to be measured using a OptiTrack motion capture system.

With hall effect sensors integrated in each joint, the performance these sensors may be evaluated by measuring the change in magnetic field under cyclic joint motion at various speeds, using the test setup shown in FIG. 6A. Three Opti-Track markers are attached on each segment to define the xz plane normal to the rotation axis +y and permit the relative angle of each joint be measured to calibrate the sensors. The angle between two segments, $\theta_c$, can be expressed as $\theta_c=\cos^{-1}(\hat{z}_1\cdot\hat{z}_2)$.

Figure 6B:
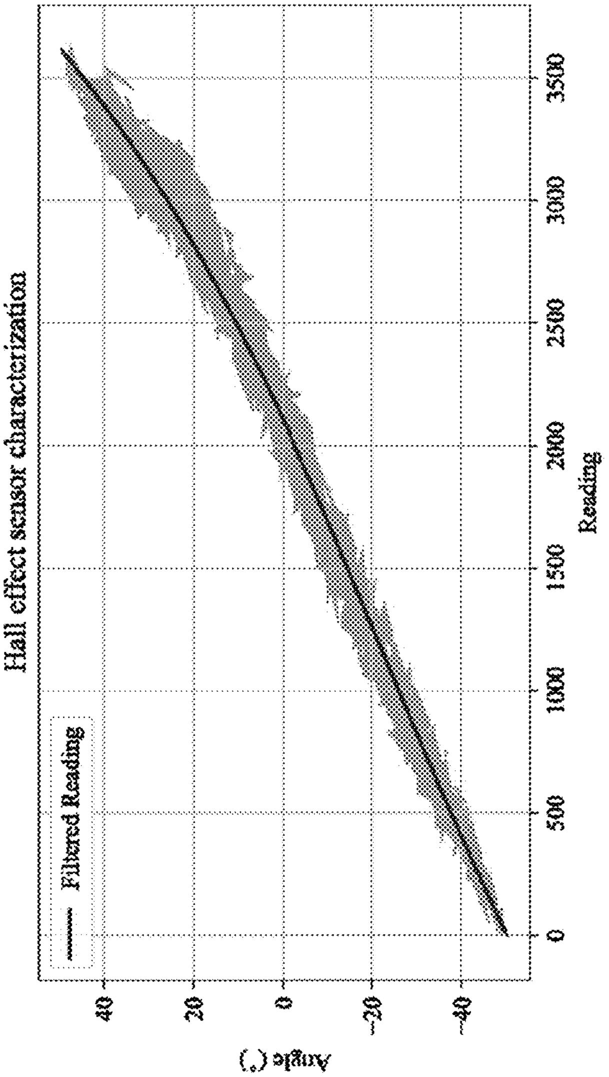
FIG. 6B is a graphical representation showing the second rigid body swept along the Y 2 axis.

Once the OptiTrack data and hall effect sensor data are collected and synchronized, the present system performs an exponential curve fitting to obtain mathematical model of the sensor to estimate the joint angle using hall effect sensor. The root-mean-square deviation (RMSE) calculation to evaluate the hall effect sensor estimation against OptiTrack orientation demonstrates a 4.07° error and the result can be seen in FIG. 6B.

Kinematic Model Verification

Figure 7B:
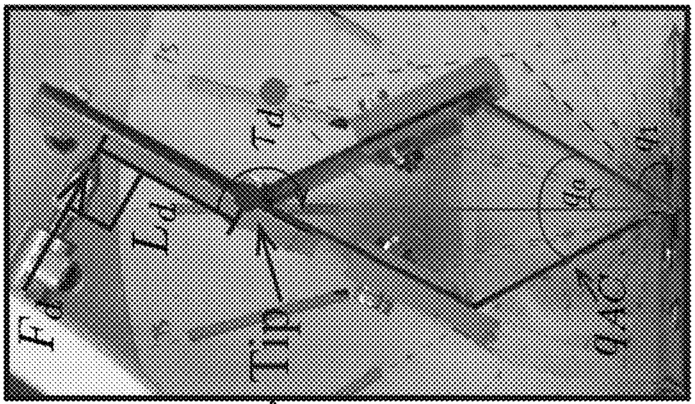
FIG. 7B is an image illustrating the joint angles, inner angle, and orientation, consistent with $q_1$, $q_{4C}$ and $q_a$ in FIGS. 4A-4C.
Figure 7A:
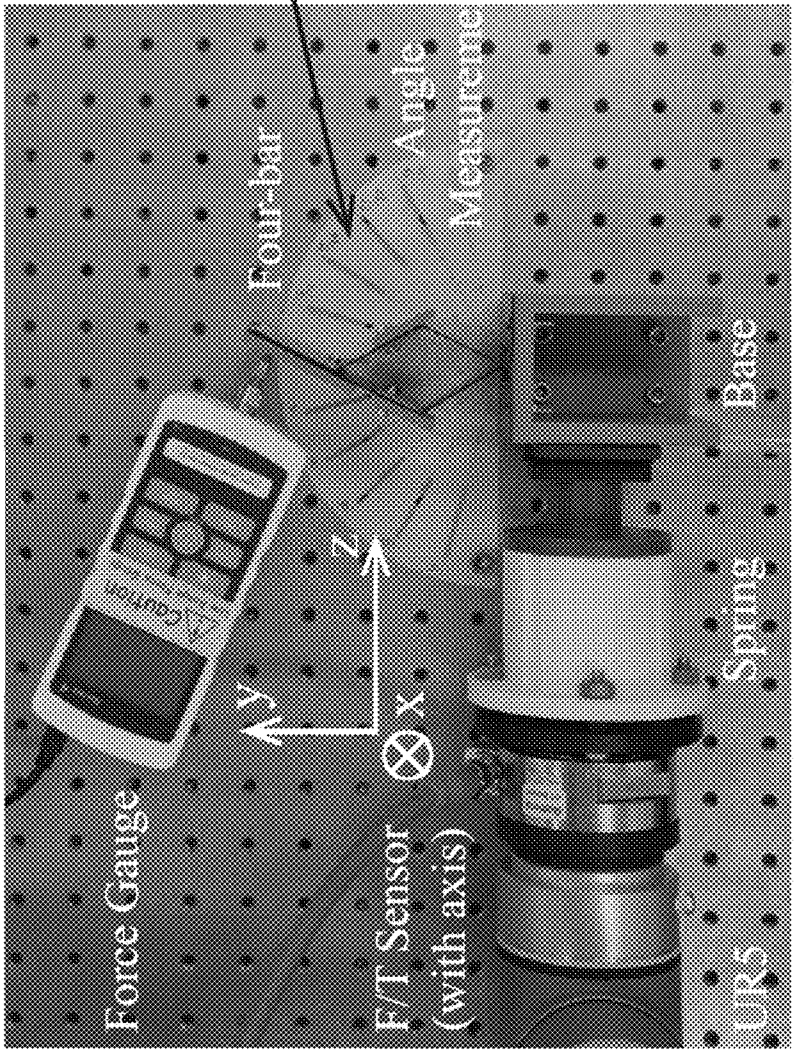
FIG. 7A is an image showing an overview of the experiments used in the four-bar element locking test and the labels of each piece of equipment.

A series of tests were performed measuring the external load required to deform the linkage while changing the configuration and locking forces to verify the static force model disclosed herein. The present system further uses a UR5 robot arm with a spring and a load cell attached at its end effector to adjust the locking pressure, as shown in FIG. 7A. According to Hooke's law, compressing the spring installed inside the white case between the brake pad and the base station increases the locking force. In addition, the present system records the z-axis force of the load cell and control the robot's displacement simultaneously using a python script. The robot arm stops once the force threshold is reached to maintain constant clamping pressure.

In this set of tests, the length of each link in this four-bar was 30 mm. After adjusting the four-bar mechanism's joint angles and orientation, the present system locked the four-bar using the test setup by compressing the locking pad. For the purposes of validating the kinematics and to ensure that the stiffness of the flexure joints do not add noticeable stiffness to the system, the present system selected a thinner flexible material for the hinge layer of the laminated origami structure. To measure the external loads applied to the tip, the present system used a Mark-10 M4-10 force gauge to push distal link of the four-bar normal to the surface until the layer slips at each configuration, where the distance to the tip of the four-bar, $L_d$ is 30 mm. During the test, the present system records the maximum force required to initiate slip in the belts and then from that value calculate the equivalent holding torque. In each combination of joint angle and orientation, the present system repeated the test ten times to obtain the average external torque to deform the mechanism, $$\overline{T}_d^f \text{ as } \overline{T}_d^f = \overline{F}_d^f L_d.$$

Figure 8A:
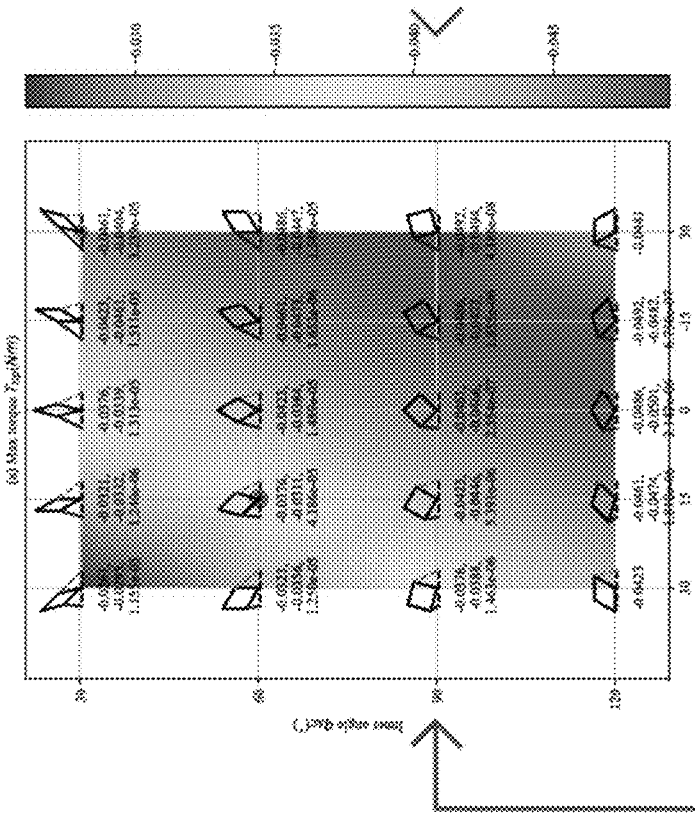
FIG. 8A is a graphical representation of the kinematic model validation showing the maximum holding torque of the four-bar using a continuous maximum simulated holding toque of the four-bar using the continuous contour plot.
Figure 8B:
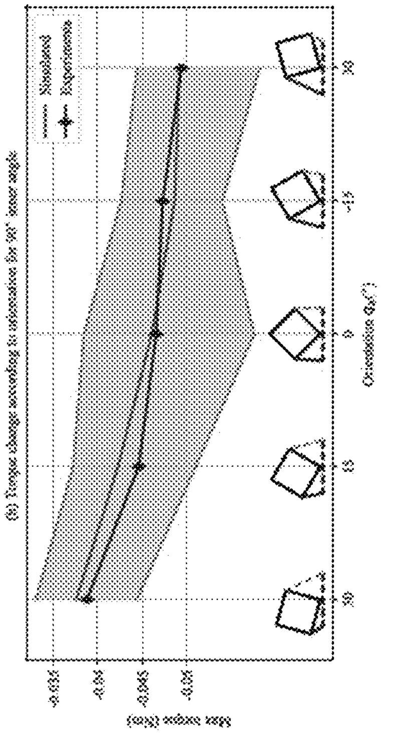
FIG. 8B is a graphical representation showing how the four-bar holding torque changes according to the orientation of the linkage in which the blue solid line indicates the experimental values and the blue region beneath it shows the range of experimental values measured from the tests, while the red solid line shows the model estimate.

The present system tested the device under a series of symmetric configurations about the four joint angles, $q_1=[30°, 45°, 60°, 75°]^T$ and four values for the inner joint angle $q_{AC}=[30°, 60°, 90°, 120°]^T$, as shown in FIG. 8A. The present system used a laser-cut alignment jig to align the links according to each configuration. As the tip torque was manually measured and applied, using smaller clamping forces improved the accuracy of the results by reducing the deformation that would be present in the system under higher loads. The present system thus applied 2N of force along the force/torque sensor's z-axis to clamp the belts in this experiment. The orientation $q_a$ of the segment was then changed to create asymmetric scenarios and validate our kinematics across a larger workspace. In this set of experiments, the orientation, $q_a$ was set to $[-30°, -15°, 0°, 15°, 30°]^T$ of the inner angle we measured before. When the inner angle is 120° and the orientation is set to −30° or 30°, the lower link of the four-bar mechanism interferes with the base. The present system thus skipped these two sets of experiments. A total of 01(4×5−2) of sub-tests were thus performed as shown in FIGS. 8A and 8B.

The average measured friction force was measured using the test setup, $f_r$ is 1.56N. The present system then uses the following Jacobian matrix, $J_t$ in its numerical form obtained from the Pynamics code generated using the method described herein to relate the belt forces, $[f_1, f_2, f_3, f_4]^T$ to the independent torque, $[T_1, T_2]^T$ of the four-bar.

$$\underbrace{\begin{bmatrix} c_1 & c_2 & c_3 & c_4 \\ c_5 & c_6 & c_7 & c_8 \end{bmatrix}}_{J_t} \begin{bmatrix} f_1 \\ f_2 \\ f_3 \\ f_4 \end{bmatrix} = \begin{bmatrix} T_1 \\ T_2 \end{bmatrix} \tag{21}$$

During the test, the external torque is applied to link $\vec{p}_{DB}$ and the left side link, the right side of the four-bar and the belts are thus in a slack state, meaning no belt force is applied. The present system thus simplifies equation (21) to $$\begin{bmatrix} c_2 & c_3 \\ c_6 & c_7 \end{bmatrix} \begin{bmatrix} f_2 \\ f_3 \end{bmatrix} = \begin{bmatrix} T_1 \\ T_2 \end{bmatrix} \tag{22}$$

The tip torque $\tau_{tip}$ can be calculated as $\tau_{tip}=T_1+T_2$. The present system uses the following optimization routine to calculate the maximum external torque the four-bar linkage can hold:

$$\text{min: } -(T_1+T_2)^2-(c_2f_2+c_3f_3+c_5f_2+c_6f_3)^2 \tag{23}$$

subject to $$h(f_2, f_3): \begin{bmatrix} 0 \\ 0 \end{bmatrix} \le \begin{bmatrix} f_2 \\ f_3 \end{bmatrix} \le \begin{bmatrix} f_r \\ f_r \end{bmatrix} \tag{24}$$

The present system then obtains the maximum holding torque the four-bar can provide and compare with the $\overline{T}_d$ values measured from the experiments, as shown in FIG. 8A.

Although the same mechanisms are implemented in full prototype, some configurations including the belt routing and base location are different. The present system thus creates two simulations replicating the experiments. These may be found in the code repository, where a detailed description of the approach can be found.

Figure 9B:
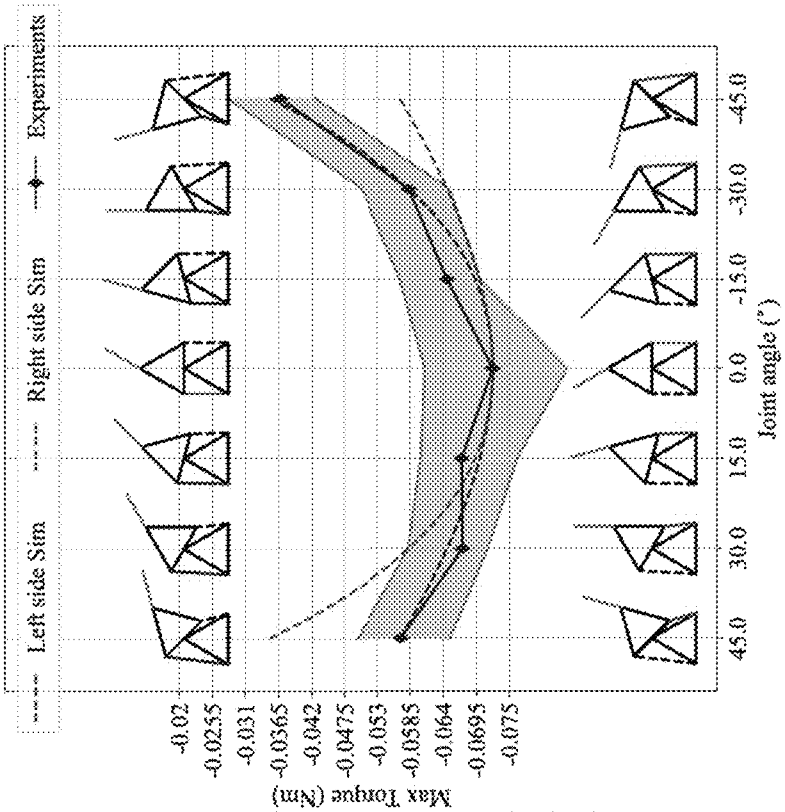
FIG. 9B is a graphical representation showing test results comparing the estimate for the maximum torque the triangle can hold across different configurations against the experimental data, where the solid line is the mean experimental value, the dashed lines indicate the model estimate, and blue region shows the range of experimental values collected at each point.
Figure 9A:
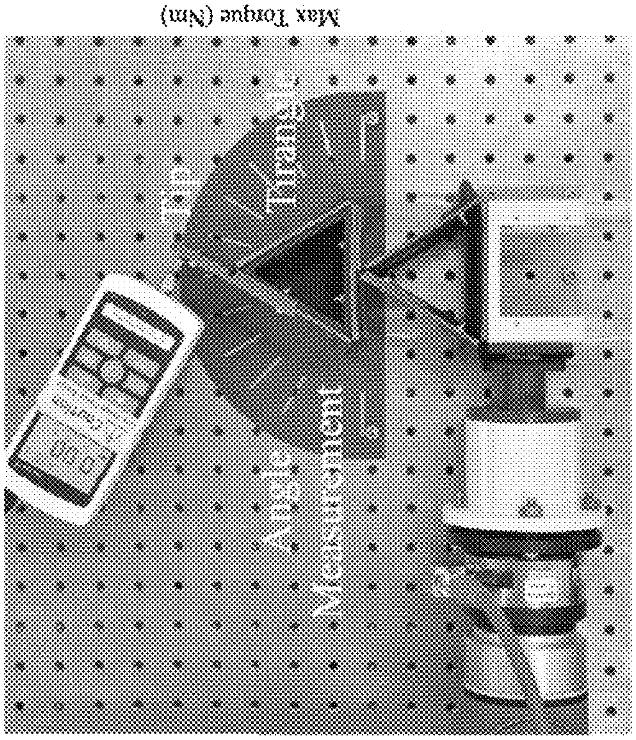
FIG. 9A is an image showing the test set-up for validating triangle element kinematics the four-bar linkage with the triangle segments, base and the angle measurement are replaced.

Using a similar approach, the present system validated the kinematics of the triangle element, where the length of the sides is 85 mm. The present system used the same test setup previously introduced in this section, but replaced the base to fit the new triangle element, as seen in FIG. 9A. The present system used the force gauge to push the tip of the upper triangle element, $T_2$ across joint angle, $q_b$=[−30°, −15°, 0°, 15°, 30°] and average the reading to obtain the torque required to deform the triangle as $$\overline{T_d^t}$$

seen in FIG. 9B.

In FIG. 9B, the blue line indicates the condition that left side belt is locked and external torque is applied clockwise, illustrated as the configuration of the triangle generated by Pynamics on the top. The blue transparent area indicates the error. Blue solid line indicated the average experimental data and the dashed blue line stands for the simulated values. As pushing the right side yields a symmetry configuration thus the force, the present system mirrored the result and present the data as red solid line and skipped the experiments.

As mentioned in FIG. 4B, the belt routing is essentially a triangle between each successive link, which means that the moment arms are a function of the current configuration of the system influencing the required locking forces and we must calculate the required force at every state. To help size dimensions of the device, we will need to create a worst-case scenario that helps us equalize the belt and braking force requirements by specifying design dimensions.

TABLE I

Robot parameter

| Parameter | Value | Description |
|---|---|---|
| $L_f$ | 40 mm | Four-bar length |
| $L_t$ | 85 mm | Triangle length |
| $H_t$ | 73 mm | Triangle height |
| $W_t$ | 85 mm | Triangle width |
| $L_b$ | 50 mm | Brake length |
| d | 80 mm | Depth |

Dimension Selection and Full System Kinematics

Figure 10:
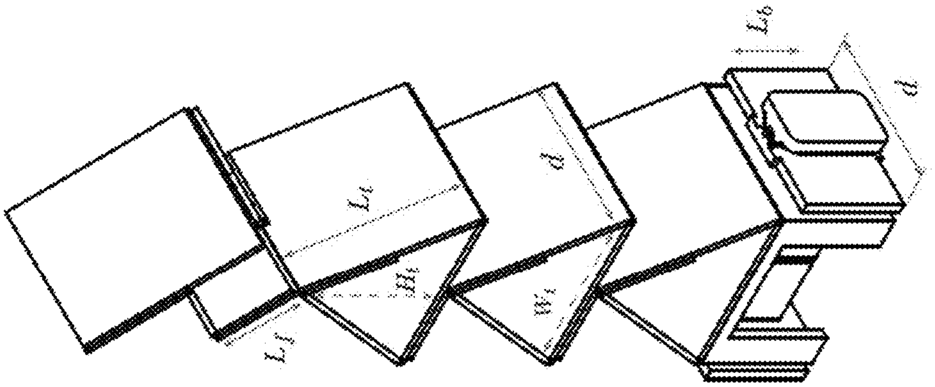
FIG. 10 is an illustration showing the dimension parameters of the robot.

The present system selects the following dimension for the mechanism, as illustrated in FIG. 10 and listed in Table I. The present system uses two NEMA 17 step motor (42 mm 42 mm 34 mm) inside the base and the width of the triangle as well as the base is 85 mm. In the current design, the present system uses three equilateral triangles (73 mm height) and one four-bar with a joint length of 40 mm on the top. The size of the brake pad is 80 mm 50 mm. These dimensions are selected based on early prototyping studies; the present system plans to optimize these values in future work to reduce weight and increase clamping force.

Using Eq. (1), a with a brake pad size of 50 mm 85 mm and the frictional coefficient of 0.017, the present system calculates the max external load is 4.9 N. The kinematic analysis also confirms that the four-bar linkage is the weakest joint in this system. This is attributed to the fact that the total effective width of the belts connected to the diamond segment is half of those connected to the triangular segments to accommodate the routing of four separate belts into the 2-DOF segment.

Figure 11A:
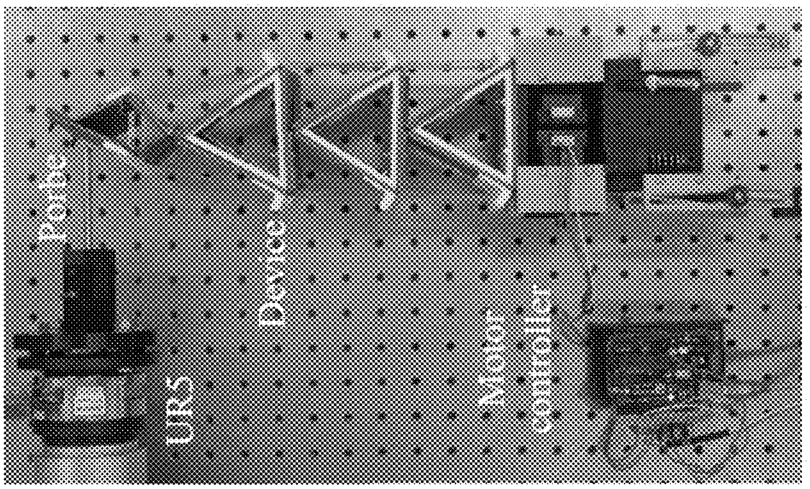
FIG. 11A is an image showing the test setup for a stiffness test.
Figure 11B:
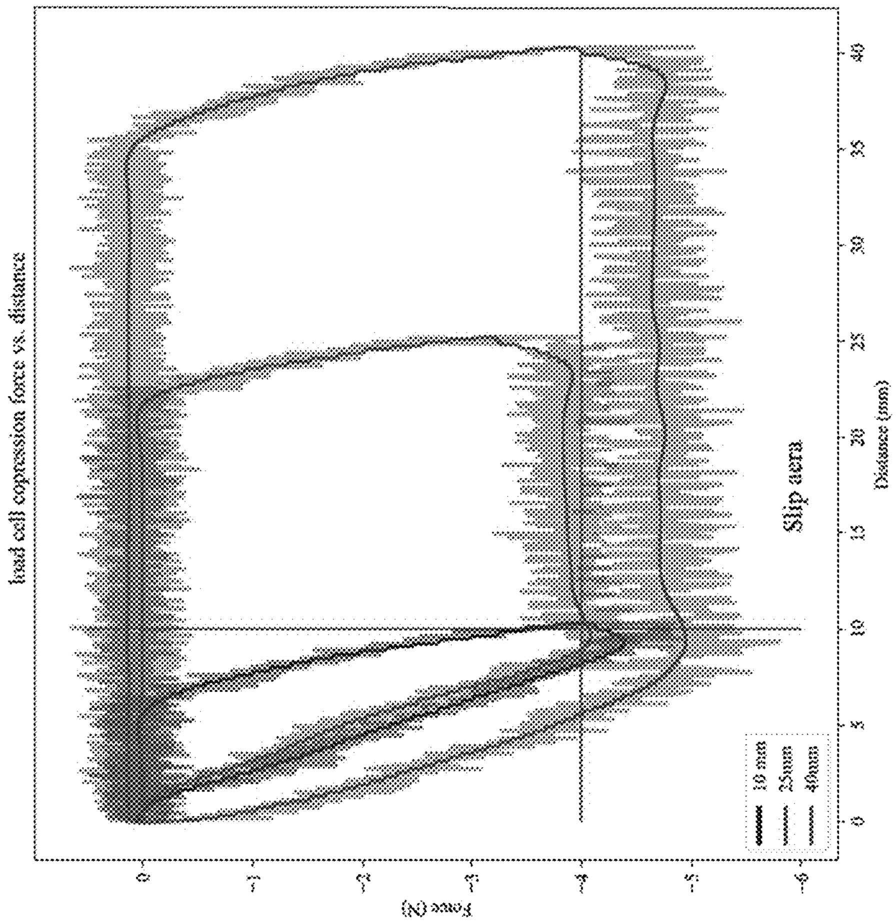
FIG. 11B is a graphical representation showing the filtered load cell force versus distance using the solid lines wherein the light-colored lines indicate the unfiltered raw data.

To test the system-level kinematics, the spine device was fully assembled, the device mounted to the test bed horizontally, and the spring replaced with brake pads, as shown in FIG. 11A. During the test, the present system first uses a Python script to lock the belts when the device is straight and command the UR5 to push on the end-effector with a metal probe. The robot arm retracts back to its origin after it pushes the probe forward a set distance. We compare the z-axis direction load cell force for three distances, 10 mm, 25 mm, and 40 mm to understand the slipping limit of the device.

When the device deforms during the test, the first link to slip is the weakest joint in the system, according to the kinematic model. We repeat the pushing test and notice that the first joint to rotate is four-bar among the experiments, confirming the kinematic model's estimate for slip in the weakest link.

System-Level Lock and Unlock

Figure 12:
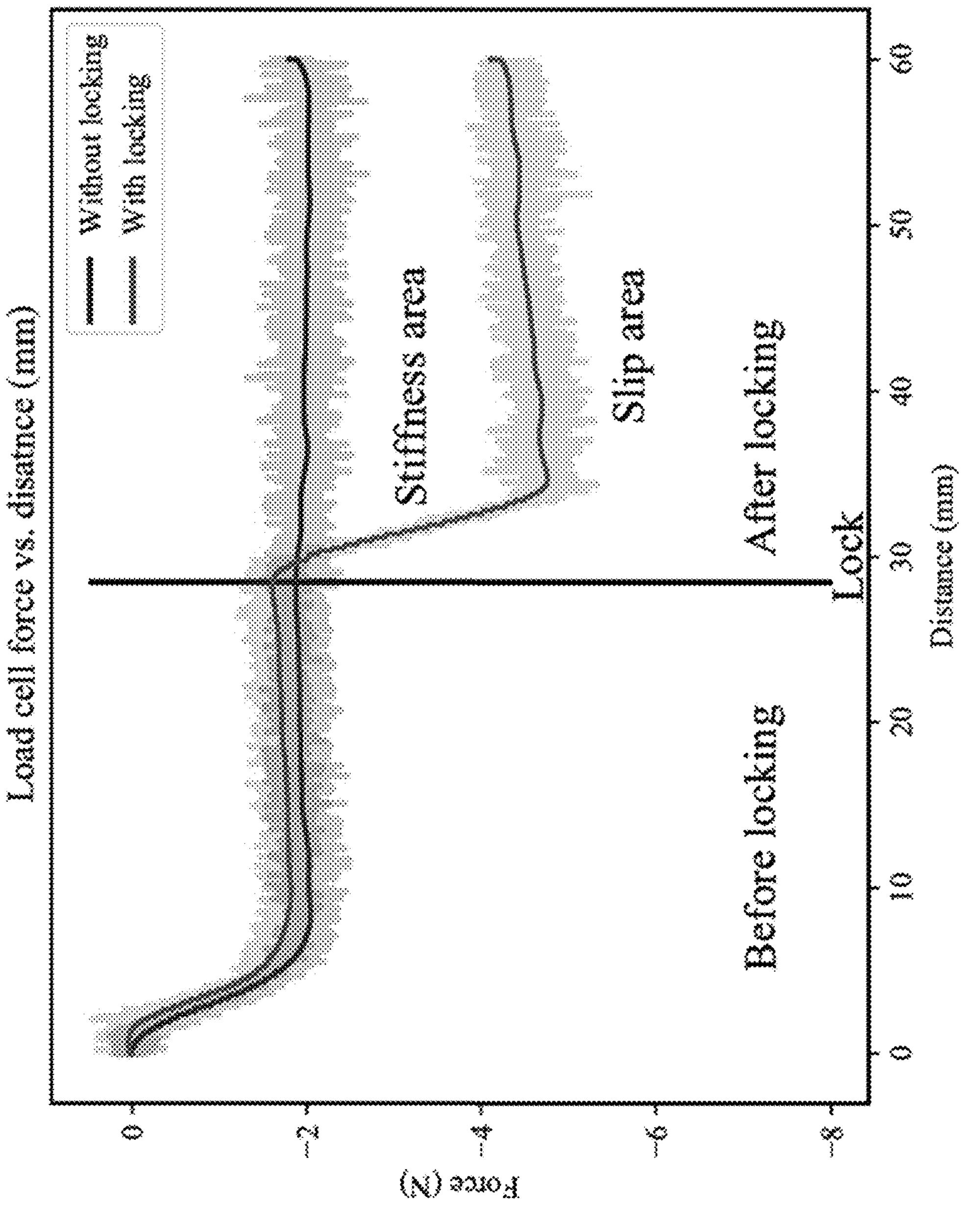
FIG. 12 is a graphical representation illustrating the system level locking test comparing the load cell force with and without locking using red and blue solid lines correspondingly, wherein the transparent error bar indicates the raw data.

In this section, the same test setup in FIG. 11A is used and start pushing the device in the unlock state. After the tip of the UR5 passes the straight, vertical configuration of the device, the device is locked and the UR5 continues to move. This is done by syncing the robot's position with the activation of the stepper motor. The present system uses the force from the load cell to differentiate between a locked and unlocked state. Before the test starts, the probe does not contact the device for calibration purposes; when the probe begins to contact the spine mechanism, a small −z direction force can be seen (starting around t=5 s)—due to system joint stiffness and belt friction—in FIG. 12. The load cell force increases after the lock activates (as shown in the red solid line). The load cell reading is compared against the unlocked system (in blue) and estimate that the brake's locking time is around 0.1 s, which is sufficient for trunk support, according to the early human subject study.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. An origami-inspired wearable device for trunk support, comprising:
- a body configured for mounting along a back of a user, the body including:
  - a base, and
  - a plurality of triangle segments formed via laminate fabrication and serially connected over the base, wherein each triangle segment of the plurality of triangle segments is fold-formed from a laminated stack including at least one rigid outer layer and a flexible hinge layer configured to permit rotation at a joint between adjacent triangle segments;
- a sensor assembly including one or more sensors positioned along the body that measure joint angles associated with the plurality of triangle segments;
- a brake system configured to stiffen lockable joints of the plurality of triangle segments, including
  - a belt engaged to each of the plurality of triangle segments, and
  - a motorized clamp that applies forces to the belt; and
- a microcontroller positioned along the base of the body that engages the motorized clamp in response to an anticipated state change computed from the joint angles to stiffen the lockable joints of the plurality of triangle segments and provide support to the user.

2. The device of claim 1, wherein a proximal end of the body aligns along a waist of the user and a distal end of the body is mounted between shoulders of the user to improve a gait of the user during obstacle avoidance tasks.

3. The device of claim 1, wherein outer faces of each of the plurality of triangle segments serve as simple joint limits to restrict motion to a predetermined range corresponding to dimensions and a base connection point.

4. The device of claim 1, wherein each of the plurality of triangle segments comprises a plurality of layers assembled during laminate fabrication, including outer layers defining rigid material, followed by layers of adhesive, a middle flexible layer to form a living hinge, and a flexible circuit layer for mounting and connecting the one or more sensors to power and communication with the microcontroller.

5. The device of claim 1, wherein the brake system applies a minimum required braking force calculated by the microcontroller to lock movement of the lockable joints based on a tensile force in each lockable joint.

6. The device of claim 1, wherein the brake system applies a minimum required braking force in the belt through a constrained minimization formulation calculated by the microcontroller and based on the measured joint angles associated with the plurality of triangle segments.

7. The device of claim 1, wherein the body further comprises a quadrilateral end effector connected serially to the plurality of triangle segments and positioned distal from the body, the quadrilateral segment comprising:
- a first vertex and a second vertex defined opposite the first vertex and configured for translational motion in response to tensile and external forces.

8. The device of claim 7, wherein the brake system applies a calculated minimum required tension in the belt through a constrained minimization formulation based on the measured joint angles associated with the plurality of triangle segments and the position of the quadrilateral end effector.

9. The device of claim 1, wherein the lockable joints provide movement in at least one degree of freedom.

10. The device of claim 1, wherein the brake system further comprises a tension mechanism that maintains tension in the belt to minimize backlash.

11. The device of claim 10, wherein the tension mechanism includes a spring-loaded pulley.

12. An origami-inspired wearable device for trunk support, comprising:
- a body defining a serial chain of lockable joints, the body comprising a plurality of segments coupled by the lockable joints, wherein at least one of the segments is fold-formed from a laminated stack including at least one rigid outer layer and a flexible hinge layer configured to permit rotation at one of the lockable joints;
- one or more sensors that measure joint angles associated with the lockable joints;
- a brake system mechanically coupled to the lockable joints, the brake system including at least one flexible belt engaged with the body and a clamp configured to selectively apply a normal clamping force to the belt to increase friction and thereby stiffen at least one of the lockable joints; and
- a microcontroller that engages the brake system to stiffen the lockable joints in response to an anticipated state change as determined using the joint angles.

13. The device of claim 12, wherein the body includes a base and plurality of segments, the plurality of segments including serially connected segments and at least one segment coupled to the base.

14. The device of claim 13, wherein each of the plurality of segments is comprised of a laminate comprised of one or more outer layers, an adhesive, a middle layer defining a hinge, and a flexible circuit layer for mounting and connecting the one or more sensors.

15. The device of claim 12, wherein the brake system includes a plurality of belts attached to each moving segment of the plurality of segments, and a lower portion of the plurality of belts is clamped to a base of the body via self-aligning brake pads.

16. The device of claim 12, wherein the brake system further comprises a tension mechanism including a spring-loaded pulley that maintains tension in a belt of the brake system to minimize backlash.

17. The device of claim 12, wherein the brake system is configured to stiffen the lockable joints by applying a normal clamping force to one or more flexible, sliding sheet-based belt layers to increase friction between the belt layers and resist relative sliding motion that would otherwise permit joint movement.

18. A method of making a wearable device for trunk support, comprising:

forming a laminate, comprising:

layering a flexible hinge material and a flexible circuit with an outer rigid layer;

embedding a sensor within the flexible circuit;

(i) cutting away a portion of the laminate (ii) folding the portion to form a triangle segment;

repeating (i)-(ii) a predetermined number of times to form a plurality of triangle segments, wherein forming the plurality of triangle segments includes fold-forming the portion from at least one rigid outer layer and a flexible hinge layer of the laminate to accommodate rotation at a joint between adjacent triangle segments of the plurality of triangle segments;

connecting serially the plurality of triangle segments to form lockable joints such that a circuit of each triangle segment is connected to each adjacent segment;

providing a base including a housing comprising a motor assembly and a motorized clamp;

connecting the plurality of triangle segments to the base with at least one belt, wherein the belt is configured to retract and extend from the motor assembly to lock and unlock the joints; and mounting a microcontroller along the base and electrically connected with the motor assembly, the motorized clamp, and the flexible circuit layer of each triangle segment.

19. The method of claim 18, further comprising providing a moveable pulley positioned along the base wherein the moveable pulley is configured to maintain tension in the belt.

20. The method of claim 18, further comprising configuring the microcontroller to engage the motorized clamp in response to an anticipated state change computed from joint angles measured by the sensor to stiffen the lockable joints of the plurality of triangle segments and provide support to a user.

* * * * *